2,976,280
HEXAMETHYLENIMINE PHENOLS AND THEIR PREPARATION

Eric B. Hotelling, Westport, Conn., assignor to Consolidation Coal Company, Pittsburgh, Pa., a corporation of Pennsylvania No Drawing. Filed May 22, 1958, Ser. No. 736,979

2 Claims. (Cl. 260—239)

This invention relates to novel aminomethyl phenols and their preparation, and more particularly to phenols containing a hexameth yleniminomethyl group. These compounds may be represented by the following formula

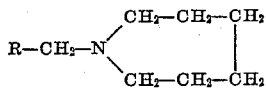

where R is a phenolic aromatic nucleus.

Hexamethylenimine has been known and available for more than half a century, and its reactions have been extensively studied. Non-phenolic aromatic compounds which contain a nuclearly attached hexamethylenimine radical, such as the N-(p-aminophenyl)-hexamethylenimines, are shown in U.S. Patent 2,612,500. The non-phenolic compounds shown are prepared by various methods, all of which differ from a Mannich condensation whereby the nitrogen atom is non-nuclearly attached to the ring by means of a methylene linkage.

The Mannich reaction, which is well known, consists in the condensation of a selected amine with formaldehyde and a compound containing at least one hydrogen atom of pronounced reactivity. As pointed out by F. F. Blicke (Organic Reactions, vol. I, chap. 10, 1942) in his discussion of the scope of the Mannich reaction, cyclic secondary amines differ considerably in their reactivity. Thus while morpholine undergoes the Mannich reaction (see U.S. Patent No. 2,040,039), dicyclohexylamine and tetrahydroquinoline do not—see J. Am. Chem. Soc., vol. 63, 1054 (1941) and vol. 58, 1570 (1936), respectively. No Mannich reaction product of hexamethylenimine with an aromatic compound is known. In particular, no hexamethyleniminomethyl phenolic derivatives have been hitherto prepared.

According to the present invention, these new compounds may be obtained by condensing any phenol having a free reactive nuclear hydrogen atom available for condensation with at least one molecular equivalent each of hexamethylenimine and formaldehyde.

Any nuclearly hydroxylated aromatic compound having phenolic properties and a readily replaceable nuclear hydrogen atom can be used in the practice of this invention. These compounds, broadly designated as "phenols," can be monohydric or polyhydric, and may contain also other nuclear substituents such as aliphatic, aromatic, or alicyclic hydrocarbon groups, halogen, alkoxy, nitro, amino, acyl, acylamino, alkylol, nitrile, thiocyano or other noninterfering radicals. Acidic groups such as $SO_3H$ interfere with the condensation and must first be neutralized. The term "phenols" as used broadly herein includes also hydroxylated polynuclear aromatic compounds such as the naphthols, hydroxyanthracenes, hydroxyquinolines, hydroxycarbazoles, and other nuclearly hydroxylated aromatics.

Typical common phenols which can be used in this condensation include phenol itself, o-, m-, and p-cresol, 2,3-, 2,4-, 2,6-, 3,4- and 3,5-xylenol, resorcinol, alpha- or beta-naphthol, o-, m-, and p-phenylphenol, benzylphenol, cyclohexylphenol, benzoylphenol, nitrophenol, chlorophenol, 2- or 4-chloro-o-phenylphenol, α,α,γ,γ-tetramethylbutylphenol, α,α,γ,γ-tetramethylbutylresorcinol, thymol, carvacrol, 4-t-butylphenol, 6-t-butylphenol, 4-t-butyl-o-cresol, 6-t-butyl-o-cresol, amylphenol, 6-t-amyl-o-cresol, bis(p-hydroxyphenyl)dimethylmethane, 4,4'-isopropylidenebis(o-cresol), 4,4'-methylenebis(o-cresol), saligenin, guaiacol, catechol, hydroquinone, 8-hydroxyquinoline, p-acetylaminophenol and pyrogallol.

The condensation can be carried out in an inert solvent such as water, alcohol, or dioxane. The formaldehyde can be gaseous, aqueous, or parafolmaldehyde.

Depending on the procedure used, the compounds are obtainable in the form of either the base or the acid addition salt thereof. Hydrochloride, hydrobromide and similar acid addition salts may be conveniently prepared from the Mannich base by well-known methods. Such salts may include, for example, those formed by reaction with the hydrohalogen acids, sulfuric acid, nitric acid, phosphoric acid, thiocyanic acid, acetic acid, propionic acid, malonic acid, succinic acid, malic acid, methanesulfonic acid, lactic acid, tartaric acid and citric acid.

The compounds produced in accordance with this invention are of commercial importance as a means for introducing a methyl group into the aromatic nucleus of a phenolic compound. Thus the compound 6-t-butyl-2,4-xylenol is a known and important article of commerce finding extensive application as an antioxidant in gasoline, rubber, oils, plastics and the like. One method practiced commercially for obtaining this compound is the direct butylation of 2,4-xylenol. However, inasmuch as o-cresol is an important raw material, now available in abundant quantity, a process suitable for commercial use for obtaining 6-t-butyl-2,4-xylenol starting with o-cresol is of considerable importance. Conveniently, o-cresol may be reacted with isobutylene in the presence of sulfuric acid as catalyst to obtain 6-t-butyl-o-cresol. In accordance with this invention, the 6-t-butyl-o-cresol may be condensed with equimolar amounts of formaldehyde and hexamethylenimine to form the phenolic Mannich base 4-(N-hexamethyleniminomethyl)-6-t-butyl-o-cresol. By hydrogenolysis of this compound, using a suitable catalyst such as a copper chromite or molybdenum sulfide catalyst, 6-t-butyl-2,4-xylenol is obtained, hexamethylenimine being regenerated.

In addition, the compounds of this invention possess important biological activity. Thus 4-(N-hexamethyleniminomethyl)-6-t-butyl-o-cresol and 4-(N-hexamethyleniminomethyl)-2-methyl-6-t-amylphenol have been found effective as amebicides against Endamoeba histolytica at a test dilution of 1:2,500. The test procedure followed was substantially that described by Thompson et al. on p. 337, of Antibiotics and Chemotherapy (May 1956). Furthermore, the compound 6-(N-hexamethyleniminomethyl)-3,4-xylenol has been found to possess antitubercular activity, completely inhibiting the growth of Mycobacterium tuberculosis at a serum broth concentration of 10 micrograms per milliliter.

The following examples illustrate this invention, but are not intended as limitations of the scope thereof.

Example 1

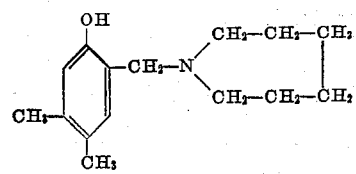

6-(N-hexameth yleniminomethyl)-3,4-xylenol.—Into a 250-ml. Erlenmeyer flask was placed 12.2 g. (0.1 mole) of 3,4-xylenol (Eastman) and about 100 ml. of absolute ethanol. Then 9.9 g. of hexamethylenimine (0.1 mole) and 8.1 g. of 37 percent aqueous formaldehyde solution (0.1 mole) were added, and the flask was stoppered, shaken, and allowed to stand overnight at room temperature. Water was then added, and the product was separated from the aqueous alcoholic solution as a heavy oil. A sample of this oil was air-dried and solidified; it was used to seed the remainder, which thereupon crystallized at once. The solid base was filtered off, washed with aqueous alcohol, and dried in vacuo; yield, 18.6 g. (80 percent). Recrystallization from aqueous isopropyl alcohol produced pure white crystals; M.P. 54–56° C. An infrared spectrum was obtained for characterization.

*Analysis.*—Calculated for $C_{15}H_{23}NO$: C, 77.20; H, 9.93; N, 6.00. Found: C, 77.19; H, 10.20; N, 5.91.

The hydrochloride was precipitated from an ethereal solution of the pure base by addition of dry hydrogen chloride gas; M.P. 176–177° C.

*Analysis.*—Calculated for $C_{15}H_{24}NOCl$: N, 5.19; Cl, 13.14. Found: N, 4.87; Cl, 13.14.

*Example 2*

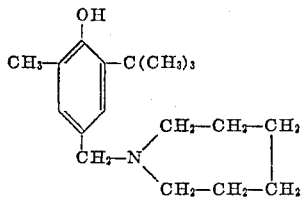

4-(N - hexamethyleniminomethyl)-6-t-butyl-o-cresol.— Following essentially the same procedure described for Example 1 and using denatured alcohol as solvent, 16.4 g. (0.1 mole) 6-t-butyl-o-cresol, 9.9 g. (0.1 mole) hexamethylenimine, and 8.1 g. (0.1 mole) 37 percent aqueous formaldehyde solution were reacted together. The yield, crude and dry, was 27.0 g. (98 percent); M.P. 91–96° C. After recrystallization from isopropyl alcohol, M.P. was 93–96° C.

*Analysis.*—Calculated for $C_{18}H_{29}NO$: C, 78.51; H, 10.61; N, 5.09. Found: C, 78.53; H, 10.10; N, 5.00.

The hydrochloride (same procedure as for Example 1) decomposed slowly upon heating and had no definite melting point.

*Analysis.*—Calculated for $C_{18}H_{30}NOCl$: C, 69.33; H, 9.70; N, 4.49; Cl, 11.37. Found: C, 69.64; H, 9.89; N, 4.34; Cl, 11.13.

*Example 3*

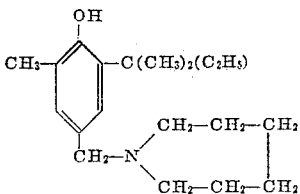

4-(N-hexamethyleniminomethyl)-6-t-amyl-o-cresol.—A 0.1-mole run was made using 17.8 g. 6-t-amyl-o-cresol, 9.9 g. hexamethylenimine, and 8.1 g. of 37 percent aqueous formaldehyde, with denatured alcohol as solvent. The procedure followed was the same as that for Example 1. The crude yield of product was 28.2 g. (98 percent). After recrystallization from isopropyl alcohol, melting point was 101–104° C.

*Analysis.*—Calculated for $C_{19}H_{31}NO$: C, 78.84; H, 10.80; N, 4.84. Found: C, 79.26; H, 11.09; N, 4.86.

The hydrochloride (same procedure as for Example 1) decomposed slowly with no definite melting point on heating.

*Analysis.*—Calculated for $C_{19}H_{32}NOCl$: C, 70.02; H, 9.90; N, 4.30. Found: C, 69.98; H, 9.73; N, 4.29.

In the foregoing examples, there has been condensed together one mole each of hexamethylenimine, formaldehyde and a dialkyl-substituted monohydric phenol. If the aromatic nucleus of the phenol has more than one reactive replaceable hydrogen atom, then more than one hexamethyleniminomethyl group may be introduced. One molecular equivalent each of formaldehyde and hexamethylenimine is reacted with the phenol for each such group to be introduced. The phenol used may be either monocyclic or polycyclic. The replaceable hydrogen may be present either on the same ring or on linked rings, in a position ortho or para to the phenolic hydroxyl group. Reactions of this type are illustrated in the following examples.

*Example 4*

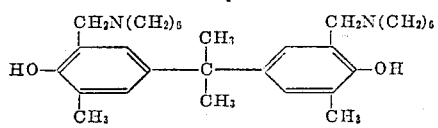

6,6'-bis(N-hexameth yleniminomethyl) -4,4' - isopropylidene-bis(o-cresol).—A run was made in denatured alcohol in accordance with the general procedure described in Example 1. The reactants were 12.8 g. (0.05 mole) 4,4'-isopropylidenebis(o-cresol), 9.9 g. (0.10 mole) hexamethylenimine, and 8.1 g. (0.10 mole) 37 percent aqueous formaldehyde solution.

After standing overnight, the heavy oil which formed was scratched to induce crystallization. Crystals were filtered off; the yield was 16.0 g. (67 percent based on phenol); M.P. (crude, dry) 144–153° C. (corr.). The compound was recrystallized from isopropyl alcohol and dried in vacuo to constant weight; M.P. 160–163° C. (corr.). An infrared curve was obtained for characterization of the compound.

*Analysis.*—Calculated for $C_{31}H_{46}N_2O_2$: C, 77.77; H, 9.69; N, 5.85. Found: C, 77.57; H, 9.71; N, 5.48, 5.71.

The dihydrochloride salt was prepared from an ethereal solution of the base; 5.0 g. of base yielded 5.3 g. (92 percent) of dry dihydrochloride; the melting point was indefinite, with decomposition.

*Analysis.*—Calculated for $C_{31}H_{48}N_2O_2Cl_2$: N, 5.08; Cl, 12.85. Found: N, 4.75; Cl, 12.81.

*Example 5*

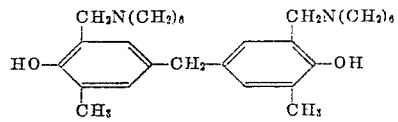

6,6'-bis(N - hexameth yleniminomethyl) - 4,4'-methylenebis(o-cresol).—A run was made in denatured alcohol in accordance with the general procedure described in Example 1. The reactants were 22.8 g. (0.1 mole) 4,4'-methylenebis(o-cresol), 19.8 g. (0.2 mole) hexamethylenimine, and 16.2 g. (0.2 mole) 37 percent aqueous formaldehyde solution.

The heavy oil which separated crystallized spontaneously on standing overnight with a little water added. The crystals were filtered and dried in vacuo; the yield was 31.3 g. (69 percent based on phenol); M.P. (crude, dry) 132–135° C. (corr.). The compound was recrystallized from isopropyl alcohol, filtered, and dried in vacuo to constant weight; M.P. 141–143° C. (corr.). An infrared curve was obtained for characterization of the compound.

*Analysis.*—Calculated for $C_{29}H_{42}N_2O_2$: C, 77.30; H, 9.39; N, 6.22. Found: C, 77.26; H, 9.54; N, 5.86.

The foregoing Mannich bis-bases of hexamethylenimine are seen as being particularly effective as curing or hardening agents for epoxy resins. Because the amino group is part of the bisphenol molecule itself, contamination problems associated with the presence in the compound of excess amounts of amino curing-agent additives, such as pentamethylenetetramine, are thereby eliminated.

While the examples illustrating this invention have been described with respect to specific phenols used, time, temperature and other conditions of condensation, the invention may be otherwise practiced, as will be readily apparent to those skilled in this art. This invention accordingly is not to be limited by the illustrative examples given, but its scope should be determined in accordance with the claims thereof.

I claim:

1. 6,6' - bis(N-hexamethyleniminomethyl) - 4,4' - isopropylidenebis(o-cresol).

2. 6,6' - bis(N - hexamethyleniminomethyl) - 4,4'-methylenebis(o-cresol).

References Cited in the file of this patent
UNITED STATES PATENTS

| | | |
|---|---|---|
| 2,033,092 | Bruson | Mar. 3, 1936 |
| 2,036,916 | Bruson | Apr. 7, 1936 |
| 2,262,720 | Earle | Nov. 11, 1941 |

OTHER REFERENCES

Blicke: Organic Reactions, vol. 1, p. 311 (1942).